(12) United States Patent
Min et al.

(10) Patent No.: US 11,822,288 B2
(45) Date of Patent: Nov. 21, 2023

(54) SELF-INTERFERENCE DIGITAL HOLOGRAPHIC SYSTEM

(71) Applicant: SAMSUNG ELECTRONICS CO., LTD., Suwon-si (KR)

(72) Inventors: Sung Wook Min, Seoul (KR); Ki Hong Choi, Seoul (KR); Jun Kyu Yim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 229 days.

(21) Appl. No.: 17/158,671

(22) Filed: Jan. 26, 2021

(65) Prior Publication Data

US 2021/0149338 A1 May 20, 2021

Related U.S. Application Data

(63) Continuation of application No. 16/233,081, filed on Dec. 26, 2018, now Pat. No. 10,921,752.

(30) Foreign Application Priority Data

Jan. 30, 2018 (KR) .................. 10-2018-0011591
Feb. 20, 2018 (KR) .................. 10-2018-0019865

(51) Int. Cl.
*G03H 1/04* (2006.01)

(52) U.S. Cl.
CPC ........... *G03H 1/0443* (2013.01); *G03H 1/041* (2013.01); *G03H 2223/22* (2013.01); *G03H 2225/32* (2013.01)

(58) Field of Classification Search
CPC .. G03H 1/0443; G03H 1/041; G03H 2225/32; G03H 2223/22; G03H 2001/0458
See application file for complete search history.

(56) References Cited

U.S. PATENT DOCUMENTS 9,348,146 B2    5/2016  Kim et al.
2017/0052508 A1 2/2017  Brooker et al.

FOREIGN PATENT DOCUMENTS

JP    2013-171293 A    9/2013

OTHER PUBLICATIONS

Jihwan Kim et al. "Fabrication of ideal geometric-phase holograms with arbitrary wavefronts" Optical Society of America, vol. 2, No. 11, Nov. 2015, (7 pages total).

(Continued)

*Primary Examiner* — Wen Huang
(74) *Attorney, Agent, or Firm* — Sughrue Mion, PLLC

(57) ABSTRACT

A self-interference digital holographic system obtains interference patterns of incident light using a simple geometric phase lens, and obtains a holographic image of a target object using the interference patterns. The self-interference digital holographic is fabricated simply in a low cost and in a miniaturized size, and the use thereof as actual products is extended to a wide range of applications. The phase of incident light is be changed by rotating a polarizer, independently of a change in the optical path. Phase-shifting effects are obtained with fewer errors in all wavelength ranges, and a more accurate holographic image is produced. A single birefringence hologram is obtained by a one-time image-capturing process by simultaneously forming interference patterns from phase-shifted linearly-polarized beams by space division, using a phase shifter on the basis of space division. Moving holographic images can be captured.

7 Claims, 5 Drawing Sheets

(56) References Cited

OTHER PUBLICATIONS

KiHong Choi et al. "Self-interference digital holography with a geometric-phase hologram lens" optics letters, vol. 42, No. 19, Oct. 1, 2017, (4 pages total).
Tatsuki Tahara et al. "Single-shot phase-shifting incoherent digital holography" Journal of Optics, vol. 19, 2017, (9 pages total).
Yuchu He et al. "Rotated infrared antenna transmitarray for the manipulation of circularly polarized wavefronts" EPJ Appl. Metamat., vol. 1, No. 8, 2014, (10 pages total).
Ziyi Zhu et al. "Self-interference polarization holographic imaging of a three-dimensional incoherent scene" Applied Physics Letters, vol. 109, 2016, (6 pages total).

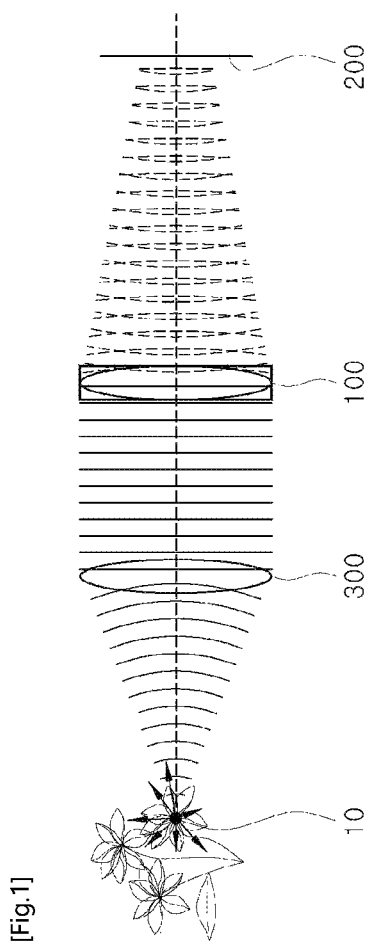
[Fig.1]

[FIG.3]
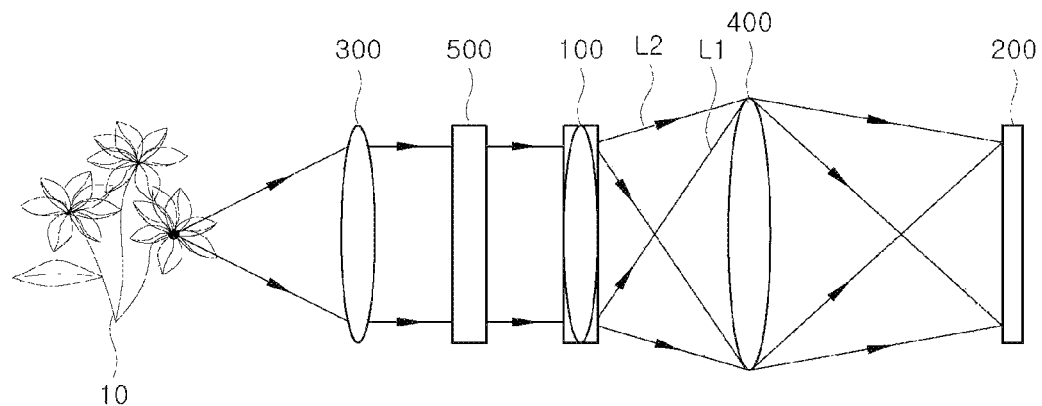
[FIG.4]
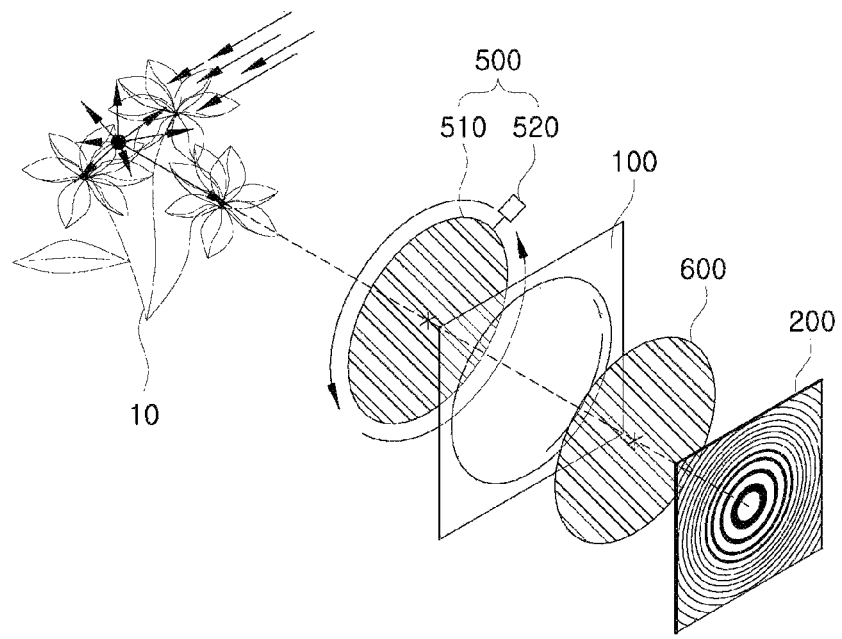

[FIG.5]
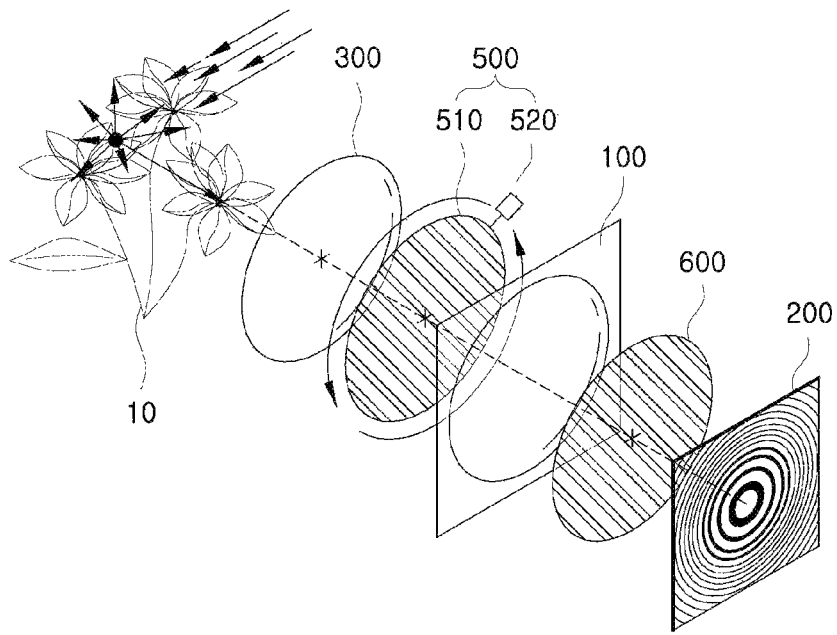
[FIG.6]
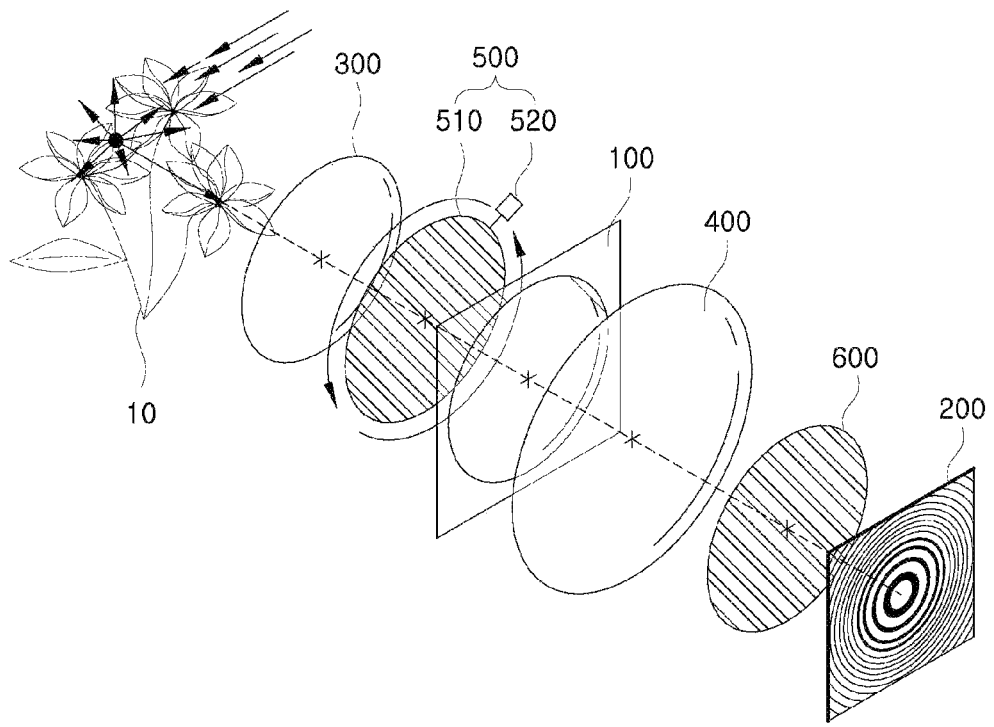

[FIG.7]
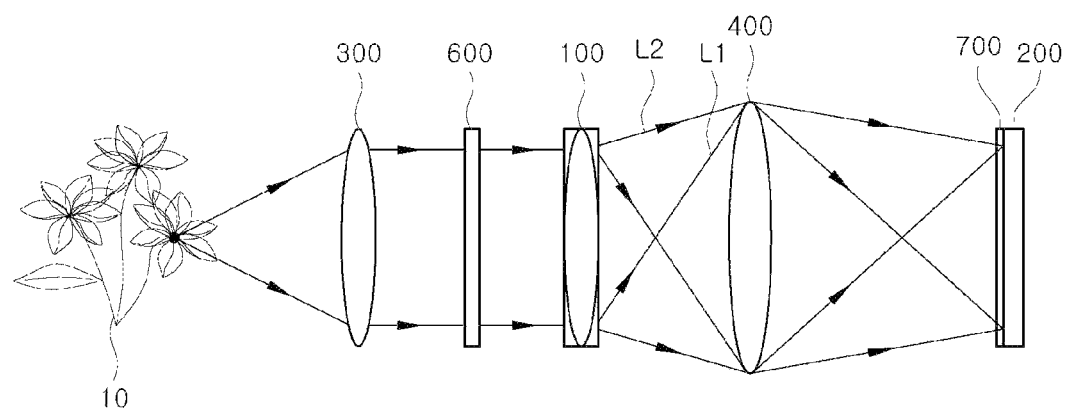
[FIG.8]
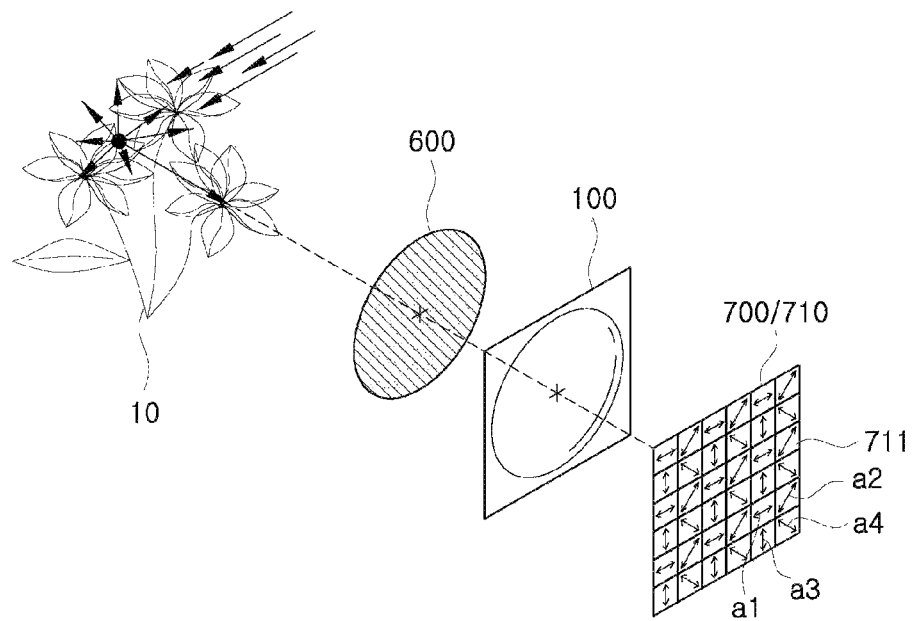

SELF-INTERFERENCE DIGITAL HOLOGRAPHIC SYSTEM

CROSS REFERENCE TO RELATED APPLICATION

The present application is a continuation of U.S. application Ser. No. 16/233,081 filed Dec. 26, 2018, which claims priority to Korean Patent Application Number 10-2018-0011591 filed on Jan. 30, 2018, and Korean Patent Application Number 10-2018-0019865 filed on Feb. 20, 2018, the entire contents of which are incorporated herein for all purposes by this reference.

BACKGROUND

Field

The present disclosure relates to a self-interference digital holographic system. More particularly, the present disclosure relates to a self-interference digital holographic system that can obtain interference patterns of incident light using a geometric phase lens, which is a simple optical component, and obtain a holographic image of a target object using the interference patterns, so that the self-interference digital holographic system can be simply fabricated in a low cost and in a miniaturized size, and the use thereof as actual products can be extended to a wide range of applications. The self-interference digital holographic system can be provided as an economically inexpensive and complete transmission system, in which the phase of incident light can be changed by rotating a polarizer, which is a simple optical component. The phase change can be performed by geometric phase shifting through the rotation of the polarizer, instead of dynamic phase shifting in which an optical path is directly changed. Since phase shifting is independent of a change in the optical path, it is possible to obtain phase-shifting effects having fewer errors in all wavelength ranges, and a more accurate holographic image can be produced. In addition, the self-interference digital holographic system can obtain a single birefringence hologram by a one-time image-capturing process by simultaneously forming interference patterns from phase-shifted linearly-polarized beams by space division, instead of sequentially obtaining the phase-shifted interference patterns, since a phase shifter for removing noise is applied on the basis of space division. Since a plurality of interference patterns can be simultaneously obtained by a one-time image-capturing process, it is possible to capture a holographic image of an object moving over time, such as a living thing, as well as an image of a still object, and it is possible to capture moving holographic images.

Description

Recently, three-dimensional (3D) imaging technology has been predicted to have significant effects in providing added value. For example, it has been predicted that 3D imaging technology will be widely used in almost all commercial and industrial fields, having applications in areas such as film-making, broadcasting, entertainment, as well as in the aerospace, military, and medical areas. Recently, 3D imaging technology has not only been discussed in terms of 3D image development communities, but is also emerging as a national issue, in relation to future research and development.

3D imaging technology is generally categorized as either a 3D imaging technique using glasses, or as a glasses-free 3D imaging technique, in which different images are provided to the eyes of a viewer, thereby creating the perception of depth based on parallax. The 3D imaging technique using glasses may further be categorized as either 3D imaging using polarizing glasses, or 3D imaging using shutter glasses. The glasses-free 3D imaging technique may further be categorized as one of integral imaging based on parallax (e.g. utilizing lenticular arrays, a parallax barrier, and parallax illumination), in which different images are provided to the eyes of a viewer as in the 3D imaging technique using glasses; volumetric 3D imaging, in which cross-sectional images of an object are continuously reproduced to actually generate a 3D image in space; and holography, in which information regarding wave surfaces of a 3D object are recorded and reproduced.

The 3D imaging technique based on binocular parallax, or stereoscopic technique, has fundamental problems, such as headaches or dizziness caused to human viewers, due to several reasons. These problems may be caused by insufficient consideration of image alignment, optical distortion, camera setting for adjustment of 3D sensation, and emotional factors during 3D image production, as well as the setting of a display device, flickering caused by alternate scanning of right and left images, 3D image distortion due to excessive negative depth, and the like.

Holography is a technique able to fundamentally overcome such issues involved in viewing stereoscopic 3D images, which are problems of 3D imaging technique based on binocular parallax. In general, viewers perceive a 3D object on the basis of light reflected from the object. When reflections of light from an object can be generated, it may be possible to form an actual object shape. A hologram is produced by illuminating such an object shape. An object wave, produced by reflecting a laser beam from an object, is combined with a laser beam incoming from another direction, and the combined beams are recorded on photographic film. When the beams incoming from different directions are combined, phase differences between object waves reflected from respective points of the object form an interference pattern. In the interference pattern, both the amplitude and phase of the object are recorded. The above-described object shape, recorded on photographic film in the form of an interference pattern, is referred to as a hologram. That is, a hologram is a 3D image recorded on a surface similar to that of photographic film using an optical interference effect created by two combined laser beams.

Holography records information regarding the amplitude and phase of light propagated from an object, unlike in typical photography, in which only intensity information of light is recorded. Since to date there have been no sensors able to directly record amplitude and phase information of visible light, such amplitude and phase information of visible light is indirectly obtained by an optical interference phenomenon. Although inference is a phenomenon created by the interaction of light waves of an object beam and a reference beam, it is difficult to obtain an interference pattern without the use of laser light, the amplitude and phase of which are artificially aligned. Accordingly, laser light has mainly been used in holography to date.

However, when laser light is used, all light, except for laser light, must be excluded. Thus, it is substantially impossible to record a hologram outdoors. In order to overcome such a real world problem, a self-interference holography technique has been developed.

Self-interference holography obtains an interference pattern by self-referencing, in which incident light, emitted or reflected from an object, is divided, depending on the spatial or polarization state. The divided light waves may propagate, after being modulated to wave surfaces having different curvatures under the influence of an interferometer or a polarization modulator, and form an interference pattern on an image sensor. In this case, self-interference holography is free of conditions on the light source, since the interference is performed by twin light waves produced from light emitted at the same time and in the same space. Accordingly, an image can be captured using any type of light, such as fluorescent light, incandescent light, LED light, or natural light.

Although the concept of such a self-interference holography technique is established, no systems in which self-interference holography has actually been realized have been substantially developed. In addition, a complex optical system must be used to form an interference pattern by splitting incident light. Accordingly, self-interference holography has not been applied to actual products.

A holography technique in which optical components are aligned along a single axis has advantages, in that the resolution and area of an image sensor can be directly used for a hologram. However, according to the interference formula, information regarding a light source and twin-image information of an object may be disadvantageously recorded, in addition to hologram information of the object. In order to remove the light source information and the twin image information from the obtained hologram information, phase shifting may be used. When an optical path of an object beam or a reference beam is finely adjusted to have a length shorter than the wavelength in two to four stages, phase information is finely varied. When intensity information of light is measured at each stage and the measured intensity information is then computed, a birefringence hologram, from which the light source information and the twin image information are removed, can be produced. In a four-stage phase shifting system, a birefringence hologram is produced, as in Formula 1:

$$\phi(x, y) = \tan^{-1} \frac{I\left(x, y; \frac{3\pi}{2}\right) - I\left(x, y; \frac{\pi}{2}\right)}{I(x, y; 0) I(x, y; \pi)}, \quad (1)$$

where (x, y) is coordinates of an image sensor surface, I is each phase-shifted image, and Φ is a birefringence hologram.

In the holograph technique, a variety of phase-shifting systems have been attempted for phase shifting. For example, in such attempts, a set of equipment, such as a piezoelectric actuator, which can finely move a mirror of an interferometer on the nanometer scale, may be used, in addition to a spatial light modulator capable of phase modulation. However, such equipment is highly expensive and may be sensitive to external environmental factors, such as temperature, moisture, and vibrations, which are problematic. In addition, since the optical path is directly modulated, sufficient phase modulation from 0° to 360° is possible only in a specific wavelength. The farther away from the specific wavelength, the greater the phase shift error may be, which is problematic.

Such a phase-shifting system may be applied in a manner of sequentially changing the phase of light. Since the above-described four-stage phase-shifting system can only produce a single birefringence hologram by combining four pieces of phase-shifted information in the four stages, a phase shifting time corresponding to the four stages is required to produce a single birefringence hologram. Accordingly, a hologram of a still object can be produced, but a hologram cannot be produced from a moving object. That is, it is impossible to capture moving holographic images, which is fundamentally problematic.

The information disclosed in the Background section is provided only to allow for a better understanding of the background and should not be taken as an acknowledgment or any form of suggestion that this information forms prior art that would already be known to a person skilled in the art.

BRIEF SUMMARY

Various aspects of the present disclosure provide a self-interference digital holographic system that can obtain interference patterns of incident light using a geometric phase lens, which is a simple optical component, and obtain a holographic image of a target object using the interference patterns. The self-interference digital holographic system can be simply fabricated in a low cost and in a miniaturized size, and the use thereof as actual products can be extended to a wide range of applications.

Also provided is a self-interference digital holographic system that can be provided as an economically inexpensive and complete transmission system, in which the phase of incident light can be changed by rotating a polarizer, which is a simple optical component, without the use of complicated optical equipment or the like. In addition, the phase change can be performed by geometric phase shifting through the rotation of the polarizer, instead of dynamic phase shifting in which an optical path is directly changed. Since phase shifting is independent of a change in the optical path, it is possible to obtain phase-shifting effects having fewer errors in all wavelength ranges. Accordingly, a more accurate holographic image can be produced.

Also provided is a self-interference digital holographic system that can obtain a single birefringence hologram by a one-time image-capturing process by simultaneously forming interference patterns from phase-shifted linearly-polarized beams by space division, instead of sequentially obtaining the phase-shifted interference patterns, since a phase shifter for removing noise is applied on the basis of space division. Since a plurality of interference patterns can be simultaneously obtained by a one-time image-capturing process, it is possible to capture a holographic image of an object moving over time, such as a living thing, as well as an image of a still object. Accordingly, it is possible to capture moving holographic images.

According to an aspect, a self-interference digital holographic system may include: a geometric phase lens disposed such that incident light propagating from a target object passes therethrough to change the incident light to left-circularly-polarized light and right-circularly-polarized light; and an image sensor receiving the left-circularly-polarized light and the right-circularly-polarized light changed by the geometric phase lens. An interference pattern is formed in a self-interference manner by interference of the left-circularly-polarized light and the right-circularly-polarized light, changed from the incident light by the geometric phase lens, and is obtained by the image sensor.

The self-interference digital holographic system may further include a phase shifter disposed in front of the geometric phase lens to change a phase of the incident light entering the geometric phase lens.

The interference patterns formed from the left-circularly-polarized light and the right-circularly-polarized light of the incident light, the phase of which is sequentially changed by the phase shifter, may be sequentially obtained and be combined, thereby producing a single birefringence hologram.

The phase shifter may include: a rotatable polarizer disposed in front of and concentrically with the geometric phase lens such that the incident light enters the geometric phase lens the rotatable polarizer, the rotatable polarizer changing the incident light to linearly-polarized light; and a polarizer driver rotating the rotatable polarizer about a central axis.

The polarizer driver may sequentially rotate the rotatable polarizer by an angle of 45°.

The interference patterns formed from the left-circularly-polarized light and the right-circularly-polarized light produced from four beams of the incident light that have been sequentially phase-changed by the phase shifter may be sequentially obtained and be combined, thereby obtaining a single birefringence holographic image.

The self-interference digital holographic system may further include a fixed polarizer disposed between the geometric phase lens and the image sensor such that the left-circularly-polarized light and the right-circularly-polarized light pass therethrough, the fixed polarizer changing the left-circularly-polarized light and the right-circularly-polarized light to linearly-polarized light.

The self-interference digital holographic system may further include an incident lens disposed in front of the phase shifter to condense the incident light propagating from the target object, so that the incident light enters the geometric phase lens through the phase shifter.

The self-interference digital holographic system may further include a floating lens disposed between the geometric phase lens and the fixed polarizer such that the left-circularly-polarized light and the right-circularly-polarized light, changed by the geometric phase lens, pass therethrough, thereby extending optical paths of the left-circularly-polarized light and the right-circularly-polarized light.

The self-interference digital holographic system may further include a space division phase shifter disposed in front of the image sensor such that the left-circularly-polarized light and the right-circularly-polarized light, changed by the geometric phase lens, are changed to two linearly-polarized beams before entering the image sensor. The image sensor may have a light receiving area included of a plurality of divided sections, and the space division phase shifter causes the linearly-polarized beams entering the image sensor have different phases according to the plurality of divided sections. The image sensor simultaneously may obtain interference patterns formed by the two linearly-polarized beams in the plurality of divided sections, and a single birefringence hologram may be obtained by combining the interference patterns.

The space division phase shifter may include a micro-polarizer array comprised of a plurality of micro-polarizers changing transmission light to linearly-polarized beams, the plurality of micro-polarizers being arranged to correspond to the plurality of divided sections of the image sensor.

The plurality of divided sections of the image sensor may be provided to correspond to a plurality of pixels of the image sensor.

The plurality of micro-polarizers may have light transmission axes at different angles, such that the linearly-polarized beams that have passed through the micro-polarizers have different phases.

Each of the light transmission axes of the plurality of micro-polarizers may have one of four different types of light transmission axis angles, which sequentially vary by 45°.

The plurality of micro-polarizers having the different types of light transmission axis angles may be provided such that same number of micro-polarizers, among the plurality of micro-polarizers, are provided for each type of the different types of light transmission axis angle.

The self-interference digital holographic system may further include a fixed polarizer disposed in front of the geometric phase lens such that the incident light enters the geometric phase lens therethrough, the fixed polarizer changing the incident light to linearly-polarized light.

The self-interference digital holographic system may further include an incident lens disposed in front of the fixed polarizer to condense the incident light propagating from the target object, so that the incident light enters the geometric phase lens through the fixed polarizer.

The self-interference digital holographic system may further include a floating lens disposed between the geometric phase lens and the space division phase shifter such that the left-circularly-polarized light and the right-circularly-polarized light, changed by the geometric phase lens, pass therethrough, thereby extending optical paths of the left-circularly-polarized light and the right-circularly-polarized light.

According to the present disclosure, it is possible to obtain interference patterns of incident light using the geometric phase lens, which is a simple optical component, and obtain a holographic image of a target object using the interference patterns. The self-interference digital holographic system can be simply fabricated in a low cost and in a miniaturized size, the use thereof as actual products can be extended to a wide range of applications.

In addition, since the phase of incident light can be changed by rotating the polarizer, which is a simple optical component, without the use of complicated optical equipment or the like, an economically inexpensive and complete transmission system can be provided. In addition, the phase change can be performed by geometric phase shifting through the rotation of the polarizer, instead of dynamic phase shifting in which an optical path is directly changed. Since phase shifting is independent of a change in the optical path, it is possible to obtain phase-shifting effects having fewer errors in all wavelength ranges. Accordingly, a more accurate holographic image can be produced.

Furthermore, it is possible to change left-circularly-polarized light and right-circularly-polarized light, changed by the geometric phase lens, to linearly-polarized light using the fixed polarizer, so that the linearly-polarized light enters the image sensor. Since the interference between the left-circularly-polarized light and the right-circularly-polarized light can be further enhanced, clearer interference patterns can be produced and a clearer holographic image can be obtained.

In addition, since the phase shifter for removing noise is applied on the basis of space division, a single birefringence hologram can be obtained by a one-time image-capturing process by simultaneously forming interference patterns from phase-shifted linearly-polarized beams by space division, instead of sequentially obtaining the phase-shifted interference patterns. Since a plurality of interference patterns can be simultaneously obtained by a one-time image-capturing process, it is possible to capture a holographic image of an object moving over time, such as a living thing, as well as an image of a still object. Accordingly, it is possible to capture moving holographic images.

BRIEF DESCRIPTION OF THE DRAWINGS

The above and other objects, features and advantages of the present disclosure will be more clearly understood from the following detailed description when taken in conjunction with the accompanying drawings, in which:

FIG. 1 is a conceptual view illustrating a basic configuration of a self-interference digital holographic system according to exemplary embodiments;

FIG. 3 is a conceptual view illustrating a configuration of a self-interference digital holographic system to which a phase shifter according to an exemplary embodiment is applied;

FIGS. 4 to 6 are perspective views illustrating a variety of configurations of the self-interference digital holographic system according to an exemplary embodiment;

FIG. 7 is a conceptual view illustrating a configuration of a self-interference digital holographic system to which a space division phase shifter according to another exemplary embodiment is applied; and FIG. 8 is a perspective view illustrating a specific configuration of the self-interference digital holographic system according to another embodiment.

DETAILED DESCRIPTION

Figure 2A:
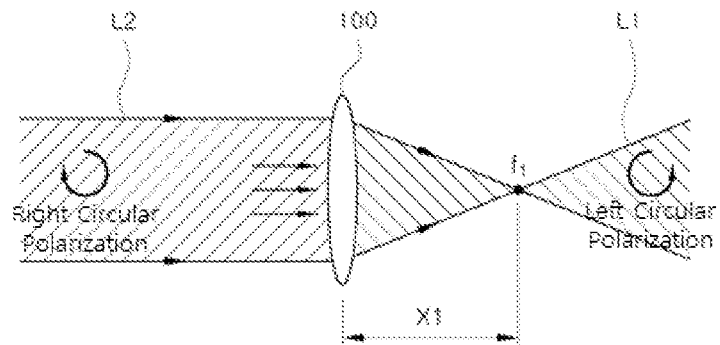
FIGS. 2A, 2B, and 2C are conceptual views illustrating characteristics of a geometric phase lens according to an exemplary embodiment.

Hereinafter, exemplary embodiments of the invention will be described in detail with reference to the accompanying drawings. Wherever possible, the same reference numerals will be used throughout the drawings and the description to refer to the same or like parts. In the following description, it is to be noted that, when the functions of conventional elements and the detailed description of elements related to the present disclosure may render the gist of the present invention unclear, a detailed description of those elements will be omitted.

Figure 2B:
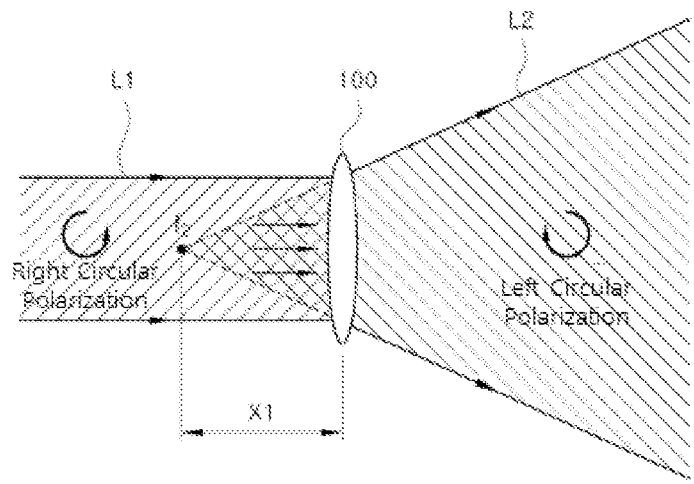
Figure 2C:
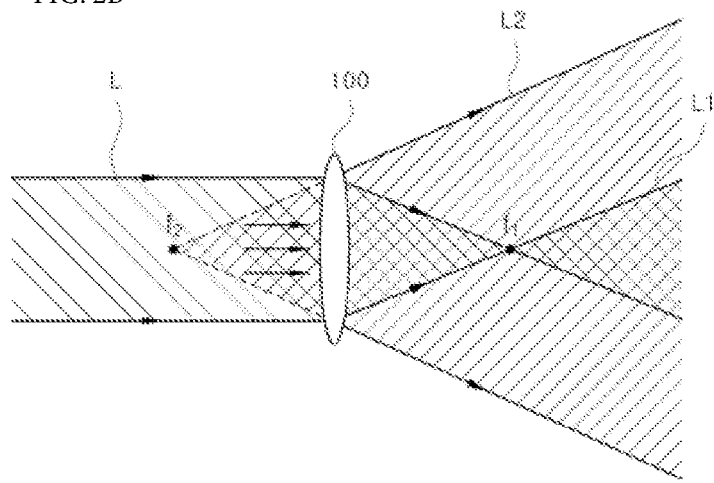

FIG. 1 is a conceptual view illustrating a basic configuration of a self-interference digital holographic system according to exemplary embodiments, FIGS. 2A, 2B, and 2C are conceptual views illustrating characteristics of a geometric phase lens according to an exemplary embodiment, and FIG. 3 is a conceptual view illustrating a configuration of a self-interference digital holographic system to which a phase shifter according to an exemplary embodiment is applied.

The self-interference digital holographic system according to exemplary embodiments is configured to form an interference pattern from incident light incoming from a target object by self-interference. The self-interference digital holographic system includes: a geometric phase lens 100 disposed such that incident light passes therethrough to change the incident light to left-circularly-polarized light and right-circularly-polarized light; and an image sensor 200 receiving the left-circularly-polarized light and the right-circularly-polarized light split by the geometric phase lens 100.

The incident light is changed to the left-circularly-polarized light and the right-circularly-polarized light while passing through the geometric phase lens 100, and an interference pattern is formed by interference between the left-circularly-polarized light and the right-circularly-polarized light. The interference pattern is formed on the image sensor 200 to be obtained by the image sensor 200.

More specifically, the geometric phase lens 100 is a device functioning as a lens, based on a predetermined fixed alignment of liquid crystal. A typical lens converges or diverges incident light by modulation the wave surface of the incident light by adjusting the thicknesses of media having different refractive indices (dynamic phase modulation). In contrast, the geometric phase lens causes a phase change by a change in the polarization state of light on the basis of the birefringence of liquid crystal, thereby modulating the wave surface of incident light. Since holographic photography is used when manufacturing the geometric phase lens, twin images of a lens surface are recorded. Accordingly, the geometric phase lens exhibits a lens characteristic having both negative and positive focal lengths.

Since liquid crystal is permanently aligned according to an alignment film formed by curing of a photosensitive polymer, instead of being electrically moved, the geometric phase lens may function as an independent passive optical device. The geometric phase lens is highly transparent, thin, and simple to manufacture, which are advantageous.

In addition, due to polarization selectivity, when incident light is right-circularly-polarized light, the incident light converges depending on the focal length while being changed to left-circularly-polarized light. When incident light is left-circularly-polarized light, the incident light diverges depending on the focal length while being changed to right-circularly-polarized light. When linearly polarized light or non-polarized light is incident, the incident light is split into converging light and diverging light, with the energy of the incident light being bisected. Here, the converging light is left-circularly-polarized light, while the diverging light is right-circularly-polarized light.

For reference, circular polarization means that the direction of vibrations of electric displacement vector (or magnetic field displacement vector) of a light wave circularly rotates. When linearly polarized light is incident with a vibration surface inclined at an angle of 45° with respect to a main axis of a quarter wave plate, light that has passed through the quarter wave plate is circularly polarized light. Right circular polarization refers to circular polarization in which an electric vector of light rotates in a clockwise direction, from the viewpoint of a viewer, while left circular polarization refers to circular polarization in which an electric vector of light rotates in a counterclockwise direction, from the viewpoint of a viewer.

When right-circularly-polarized light L2 is incident as illustrated in FIG. 2A, the light is changed to left-circularly-polarized light L1. The left-circularly-polarized light L1 passing through the geometric phase lens 100 converges to a focus f1 having a positive focal length X1. When left-circularly-polarized light L1 is incident as illustrated in FIG. 2B, the light is changed to right-circularly-polarized light L2. The right-circularly-polarized light L2 passing through the geometric phase lens 100 diverges along paths extending from a focus f2 having a negative focal length X1. When linearly-polarized light or non-polarized light L is incident as illustrated in FIG. 2C, the energy of the incident light is bisected, so that a portion of the incident light is changed to left-circularly-polarized light L1, which converges to a positive focus f1, while another portion of the incident light is changed to right-circularly-polarized light L2, which diverges along paths extending from a negative focus f2.

Accordingly, incident light emitted or reflected from the target object 10 is changed to left-circularly-polarized light and right-circularly-polarized light through the geometric phase lens 100, so that an interference pattern is formed by mutual interference between the left-circularly-polarized light and right-circularly-polarized light. The interference pattern is formed on the image sensor 200 to be obtained by the image sensor 200.

The self-interference holographic system according to the present disclosure can obtain information regarding incident light, on the basis of information regarding the interference pattern obtained by the image sensor 200. That is, a holographic image can be obtained using the interference pattern obtained by the image sensor 200.

The holographic image obtained as above can be displayed on a hologram display device, which may be used in a variety of forms.

As described in the Background section, in the case of a holography technique, both light source information and twin-image information of an object are recorded in the image sensor 200 obtaining the holographic image using the interference pattern, so noise may be created. Accordingly, a phase shifter 500 is provided to remove the light source information and the twin-image information from the holographic image.

The phase shifter 500 according an exemplary embodiment is disposed in front of the geometric phase lens 100 and is configured to change the phase of light entering the geometric phase lens 100. The phase shifter 500 is configured based on geometric phase shifting in which a phase is shifted while an optical path is maintained, instead of dynamic phase shifting in which an optical path is directly changed, unlike in the related art.

Since the phase shifter 500 is configured based on geometric phase shifting, the phase shifter 500 having a simple structure may be fabricated. Since the phase shifter 500 is independent of phase shifting based on a change in the optical path, it is possible to obtain phase-shifting effects having fewer errors in all wavelength ranges.

The phase of incident light is sequentially shifted through the phase shifter 500. The phase-changed light is then changed to left-circularly-polarized light and right-circularly-polarized light while passing through the geometric phase lens 100. The left-circularly-polarized light and the right-circularly-polarized light form interference patterns. The image sensor 200 can sequentially obtain interference patterns formed by the interaction between the left-circularly-polarized light and the right-circularly-polarized light, produced from the incident light that has been sequentially phase-changed, and produce a single birefringence holographic image by combining and computing the interference patterns.

The self-interference digital holographic system having the above-described configuration, according to an exemplary embodiment, can obtain interference patterns of incident light using the geometric phase lens, which is a simple optical component, and obtain a holographic image using the interference patterns. Since the self-interference digital holographic system can be simply fabricated in a low cost and in a miniaturized size, the use thereof can be extended to a wide range of applications.

In addition, since the phase of incident light can be changed by rotating the polarizer, which is a simple optical component, without the use of complicated optical equipment or the like, an economically inexpensive and complete transmission system can be provided. In addition, the phase change can be performed by geometric phase shifting through the rotation of the polarizer, as will be described later, instead of dynamic phase shifting in which an optical path is directly changed. Since phase shifting is independent of a change in the optical path, it is possible to obtain phase-shifting effects having fewer errors in all wavelength ranges. Accordingly, a more accurate holographic image can be produced.

An incident lens 300 may be disposed in front of the phase shifter 500. The incident lens 300 condenses incident light propagating from the target object 10, allowing the incident light to enter the geometric phase lens 100 through the phase shifter 500. The incident lens 300 is designed to introduce a portion of light, propagating from the target object 10 in random directions, to the holographic system according to the present disclosure, and functions as an object lens of a camera, a microscope, or the like.

FIGS. 4 to 6 are perspective views illustrating a variety of configurations of the self-interference digital holographic system according to an exemplary embodiment.

The phase shifter 500 according to an exemplary embodiment is configured based on geometric phase shifting instead of dynamic phase shifting in which an optical path is directly changed. As illustrated in FIGS. 4 to 6, the phase shifter 500 may include a turntable-shaped rotatable polarizer 510 and a polarizer driver 520 rotating the rotatable polarizer 510.

The rotatable polarizer 510 is a polarizer by which the incident light is changed to linearly-polarized light. The rotatable polarizer 510 is disposed in front of and concentrically with the geometric phase lens 100 such that the incident light enters the geometric phase lens 100 through the rotatable polarizer 510, and is configured to change the incident light to linearly-polarized light.

The polarizer driver 520 is configured to rotate the rotatable polarizer 510 about the central axis, as indicated by arrows in FIGS. 4 to 6. The polarizer driver 520 may include a pressing roller (not shown) rotating in close contact with the periphery of the rotatable polarizer 510, a drive motor (not shown) rotating the pressing roller, and the like. The polarizer driver 520 may have a variety of other structures that can rotate the turntable-shaped rotatable polarizer 510.

The polarizer driver 520 may be configured to sequentially rotate the rotatable polarizer 510 by an angle of 45°.

It is possible to sequentially obtain interference patterns formed by the interaction between the left-circularly-polarized light and the right-circularly-polarized light, produced from four beams of the incident light that have been sequentially phase-changed by the phase shifter 500, and produce a single birefringence holographic image by combining and computing the interference patterns.

In addition, as illustrated in FIGS. 4 to 6, a fixed polarizer 600 may be provided between the geometric phase lens 100 and the image sensor 200 to change the left-circularly-polarized light and the right-circularly-polarized light, changed by the geometric phase lens 100, to linearly-polarized light while allowing the left-circularly-polarized light and the right-circularly-polarized light to pass therethrough.

Although interference patterns may be formed on the image sensor 200 by the interaction between the left-circularly-polarized light and the right-circularly-polarized light without the fixed polarizer 600, it is possible to change the left-circularly-polarized light and the right-circularly-polarized light, changed by the geometric phase lens 100, to the same linearly-polarized light using the fixed polarizer 600, thereby further enhancing the interference between the left-circularly-polarized light and the right-circularly-polarized light and producing clearer interference patterns on the image sensor 200.

In addition, as illustrated in FIG. 5, the incident lens 300 may be disposed in front of and concentrically with the phase shifter 500, allowing the incident light propagating from the target object 10 to enter the geometric phase lens through the phase shifter 500. The incident lens 300 is designed to introduce a portion of light, propagating from the target object 10 in random directions, to the holographic system according to the present disclosure, and functions as an object lens of a camera, a microscope, or the like. The incident lens 300 may not be provided, in which case the geometric phase lens 100 may further function as an object lens.

In addition, as illustrated in FIG. 6, a floating lens 400 may be disposed between the geometric phase lens 100 and the fixed polarizer 600, allowing the left-circularly-polarized light and the right-circularly-polarized light, changed by the geometric phase lens 100, to pass therethrough, thereby extending the optical paths of the left-circularly-polarized light and the right-circularly-polarized light. The floating lens 400 may be selectively disposed by a user, depending on the configuration of the holographic system. For example, in the case of a microscope, a telescope, or the like, the floating lens 400 may be used to extent the optical paths. In addition, since the floating lens 400 extends the optical paths of the left-circularly-polarized light and the right-circularly-polarized light, the effect of interference between the left-circularly-polarized light and the right-circularly-polarized light can be further enhanced and clearer interference patterns can be obtained.

FIG. 7 is a conceptual view illustrating a configuration of a self-interference digital holographic system to which a space division phase shifter according to another exemplary embodiment is applied; and FIG. 8 is a perspective view illustrating a specific configuration of the self-interference digital holographic system according to another embodiment.

The self-interference digital holographic system according to another exemplary embodiment further includes a space division phase shifter 700 changing the left-circularly-polarized light and the right-circularly-polarized light, changed by the geometric phase lens 100, to linearly-polarized light to enter the image sensor 200.

Described of the principle of the self-interference digital holographic system without the space division phase shifter 700, incident light is changed to left-circularly-polarized light and right-circularly-polarized light while passing through the geometric phase lens 100 and interference patterns are formed by the interference of the left-circularly-polarized light and the right-circularly-polarized light, as described above. The interference patterns are formed on the image sensor 200 to be obtained by the image sensor 200.

In the case of a holograph technique, both light source information and twin-image information of an object are recorded in the image sensor 200 obtaining a holographic image using an interference pattern, so noise may be created. Accordingly, a phase shift module is provided to remove the light source information and the twin-image information from the holographic image. However, there is a fundamental problem, in that none of generally studied phase shift modules can capture a moving image of a moving object, since such phase shift modules are configured to change the phase of light in a time sequence.

According to another exemplary embodiment, the space division phase shifter 700 based on space division is provided as a phase shifter.

The space division phase shifter 700 is disposed in front of the image sensor 200, and causes the left-circularly-polarized light and the right-circularly-polarized light, changed by the geometric phase lens 100, to be changed to two beams of linearly-polarized light before entering the image sensor 200. Here, the space division phase shifter 700 is configured such that the linearly-polarized light beams entering the image sensor 200 have different phases according to a plurality of divided sections of a light receiving area of the image sensor 200.

Described in more detail, the space division phase shifter 700 may include a micro-polarizer array 710 attached to the front surface of the image sensor 200. The micro-polarizer array 710 is comprised of a plurality of micro-polarizers 711 changing transmission light to linearly-polarized light, the plurality of micro-polarizers 711 being arranged to correspond to the plurality of divided sections of the image sensor 200.

For example, in the case in which the image sensor 200 includes a plurality of pixels, the plurality of divided sections of the image sensor 200 may be divided according to the plurality of pixels, respectively, and the plurality of micro-polarizers 711 may be configured to correspond to the plurality of pixels of the image sensor 200, respectively. Accordingly, the plurality of micro-polarizers 711, attached to the front surface of the image sensor 200, may be in the same arrangement as that of the pixels of the image sensor 200.

Each of the plurality of micro-polarizers 711 is provided as a polarizer changing transmission light to linearly-polarized light. Here, light transmission axes a1, a2, a3, and a4 of the plurality of micro-polarizers 711 have different angles, such that linearly-polarized beams, changed by the micro-polarizers 711, have different phases according to the micro-polarizers 711.

For example, each of the light transmission axes a1, a2, a3, and a4 of the micro-polarizers 711 may be configured to have any one of four (4) different types of light transmission axis angles, which sequentially vary by 45°, as illustrated in FIG. 8. According to this configuration, linearly-polarized light changed by each of the micro-polarizers 711 has a phase difference of 45°, depending on the angle of the light transmission axes a1, a2, a3, and a4. The plurality of micro-polarizers 711 having different types of light transmission axis angles may be provided such that the same number of micro-polarizers 711 are provided for each type of light transmission axis angle.

According to this configuration, incident light propagating from the target object 10 is changed to left-circularly-polarized light and right-circularly-polarized light while passing through the geometric phase lens 100. The left-circularly-polarized light and the right-circularly-polarized light are changed to two linearly-polarized beams while passing through the micro-polarizers 711 arranged to correspond to the divided sections of the image sensor 200, before entering the image sensor 200. Then, the linearly-polarized beams are received by the image sensor 200. Here, the interference of two linearly-polarized beams, changed from left-circularly-polarized light and the right-circularly-polarized light, forms an interference pattern to be obtained by the image sensor 200. Such an interference pattern, formed from the two linearly-polarized beams, is formed by each of the plurality of micro-polarizers 711. The micro-polarizers 711 have different phases of linearly-polarized light due to different angles of the light transmission axes a1, a2, a3, and a4. Accordingly, it is possible to simultaneously obtain interference patterns formed from four phase-shifted linearly-polarized beams.

In other words, in the process of obtaining a holographic image using interference patterns, a plurality of interference patterns having different phases are obtained using the phase shifter in order to remove noise. The phase shifter according to exemplary embodiments can simultaneously obtain a plurality of phase-changed interference patterns by space division, although phase shifters of the related art are configured to change the phase in the time sequence.

As described above, it is possible to simultaneously form interference patterns from a plurality of phase-shifted linearly-polarized beams and combine and compute the obtained interference patterns, thereby obtaining a single birefringence hologram.

Accordingly, the self-interference digital holographic system according to exemplary embodiments can obtain a single birefringence hologram by a one-time image-capturing process by simultaneously forming interference patterns from phase-shifted linearly-polarized beams by space division, instead of sequentially obtaining the interference patterns. In addition, since a plurality of interference patterns can be simultaneously obtained by a one-time image-capturing process, it is possible to capture a holographic image of an object moving over time, such as a living thing, as well as an image of a still object. Accordingly, it is possible to capture moving holographic images.

In addition, it is possible to obtain interference patterns of incident light using the geometric phase lens, which is a simple optical component, and obtain a holographic image using the interference patterns. Since the self-interference digital holographic system according to exemplary embodiments can be simply fabricated in a low cost and in a miniaturized size, the use thereof can be extended to a wide range of applications.

In addition, the fixed polarizer 600 may be provided in front of the geometric phase lens 100 such that incident light enters the geometric phase lens 100 through the fixed polarizer 600. The fixed polarizer 600 changes the incident light to linearly-polarized light.

Although a plurality of phase-shifted interference patterns may be obtained as described above, without the fixed polarizer 600, incident light can be changed to linearly-polarized light by the fixed polarizer 600 before entering the geometric phase lens 100 in order to further enhance the interference of left-circularly-polarized light and right-circularly-polarized light, as well as the interference of the linearly-polarized light enabled by the space division phase shifter 700. Consequently, clearer interference patterns may be formed on the image sensor 200.

In addition, the incident lens 300 may be provided in front of the fixed polarizer 600 to converge incident light propagating from the target object 10, so that the incident light enters the geometric phase lens 100 through the fixed polarizer 600.

The incident lens 300 may be disposed in front of and concentrically with the fixed polarizer 600. Accordingly, the incident light propagating from the target object 10 to enter the geometric phase lens 100 through the fixed polarizer 600. The incident lens 300 is designed to introduce a portion of light, propagating from the target object 10 in random directions, to the holographic system according to the present disclosure, and functions as an object lens of a camera, a microscope, or the like.

In addition, the floating lens 400 may be disposed between the geometric phase lens 100 and the space division phase shifter 700, allowing left-circularly-polarized light and right-circularly-polarized light, changed by the geometric phase lens 100, to pass therethrough, thereby extending optical paths of the left-circularly-polarized light and the right-circularly-polarized light. The floating lens 400 may be selectively disposed by a user, depending on the configuration of the holographic system. For example, in the case of a microscope, a telescope, or the like, the floating lens 400 may be used to extent the optical paths. In addition, since the floating lens 400 extends the optical paths of the left-circularly-polarized light and the right-circularly-polarized light, the effect of interference between the left-circularly-polarized light and the right-circularly-polarized light can be further enhanced and clearer interference patterns can be obtained.

The foregoing descriptions of specific exemplary embodiments of the present disclosure have been presented with respect to the drawings and are not intended to be exhaustive or to limit the present disclosure to the precise forms disclosed, and obviously many modifications and variations are possible for a person having ordinary skill in the art in light of the above teachings. It is intended therefore that the scope of the present disclosure not be limited to the foregoing embodiments, but be defined by the Claims appended hereto and their equivalents.

What is claimed is:

1. A self-interference digital holographic system comprising:
   a phase shifter configured to change incident light to linearly-polarized light and sequentially vary a polarization direction of the linearly-polarized light by an angle of 45° a plurality of times;
   a geometric phase lens configured to change the linearly-polarized light to left-circularly-polarized light and right-circularly-polarized light; and
   an image sensor configured to obtain an interference pattern formed from the left-circularly-polarized light and the right-circularly-polarized light based on the phase shifter sequentially varying the polarization direction of the linearly-polarized light by the angle of 45° the plurality of times.

2. The self-interference digital holographic system according to claim 1, wherein the interference patterns formed from the left-circularly-polarized light and the right-circularly-polarized light of the incident light, the phase of which is sequentially changed by the phase shifter, are sequentially obtained and are combined, thereby producing a single birefringence hologram.

3. The self-interference digital holographic system according to claim 2, wherein the phase shifter comprises:
   a rotatable polarizer disposed in front of and concentrically with the geometric phase lens such that the incident light enters the geometric phase lens through the rotatable polarizer, the rotatable polarizer changing the incident light to linearly-polarized light; and
   a polarizer driver rotating the rotatable polarizer about a central axis.

4. The self-interference digital holographic system according to claim 3, wherein the polarizer driver sequentially rotates the rotatable polarizer by an angle of 45°.

5. The self-interference digital holographic system according to claim 4, wherein the interference patterns formed from the left-circularly-polarized light and the right-circularly-polarized light produced from four beams of the incident light that have been sequentially phase-changed by the phase shifter are sequentially obtained and are combined, thereby obtaining a single birefringence holographic image.

6. The self-interference digital holographic system according to claim 1, wherein the phase shifter comprises:
   a polarizer configured to sequentially vary the polarization direction of the linearly-polarized light by the angle of 45°.

7. The self-interference digital holographic system according to claim 1, wherein the phase shifter comprises:

a driver configured to control a polarizer in the phase shifter to sequentially vary the polarization direction of the linearly-polarized light by the angle of 45°.

* * * * *